United States Patent
Hattori et al.

(10) Patent No.: US 6,676,870 B1
(45) Date of Patent: Jan. 13, 2004

(54) PROCESS FOR THE PREPARATION OF FIBER-FILLED THERMOPLASTIC RESIN COMPOSITION

(75) Inventors: Takahiro Hattori, Chiba (JP); Hiroshi Takei, Chiba (JP)

(73) Assignee: Chisso Corporation, Osaka (JP)

(*) Notice: Subject to any disclaimer, the term of this patent is extended or adjusted under 35 U.S.C. 154(b) by 0 days.

(21) Appl. No.: 09/529,351

(22) PCT Filed: Oct. 14, 1998

(86) PCT No.: PCT/JP98/04632
§ 371 (c)(1),
(2), (4) Date: Apr. 13, 2000

(87) PCT Pub. No.: WO99/20446
PCT Pub. Date: Apr. 29, 1999

(30) Foreign Application Priority Data

Oct. 17, 1997 (JP) .............................................. 9-303709

(51) Int. Cl.⁷ ............................................... B29B 11/16
(52) U.S. Cl. ..................... 264/141; 264/136; 264/211; 264/15
(58) Field of Search .................... 264/15, 141, 172.19, 264/211, 211.24, 143, 148, 136

(56) References Cited

U.S. PATENT DOCUMENTS

| | | | | |
|---|---|---|---|---|
| 4,612,155 A | * | 9/1986 | Wong et al. ............ | 264/171.14 |
| 4,939,002 A | * | 7/1990 | Hilakos ................... | 118/405 |
| 4,997,707 A | * | 3/1991 | Otawa et al. ............ | 156/285 |
| 5,264,174 A | * | 11/1993 | Takei et al. ............. | 264/211.23 |
| 5,536,613 A | * | 7/1996 | Chang et al. ............ | 264/210.1 |
| 5,741,384 A | * | 4/1998 | Pfeiffer et al. ........... | 156/182 |
| 5,753,169 A | * | 5/1998 | Kaito et al. ............. | 264/211.19 |
| 5,935,508 A | * | 8/1999 | Fernyhough et al. .... | 264/136 |

FOREIGN PATENT DOCUMENTS

| | | | |
|---|---|---|---|
| EP | 0370735 A2 | 5/1990 | |
| EP | 0370736 A1 | 5/1990 | |
| GB | 1442527 | 7/1976 | |
| GB | 1 537 240 | 12/1978 | |
| JP | 50-10837 | 2/1975 | |
| JP | 51-122145 | 10/1976 | |
| JP | 62238709 A | * 10/1987 | ............ B29B/9/06 |
| JP | 1-263123 | 10/1989 | |
| JP | 8-216266 | 8/1996 | |

OTHER PUBLICATIONS

European Search Report dated Nov. 27, 2000.

* cited by examiner

*Primary Examiner*—Michael Colaianni
*Assistant Examiner*—Geoffrey P. Shipsides
(74) *Attorney, Agent, or Firm*—McDermott, Will & Emery

(57) ABSTRACT

A production process for a long fiber-filled thermoplastic resin composition using an apparatus having an extruder with at least two raw material feeding ports and a resin impregnating bath at the tip of the extruder, comprising the steps of feeding a resin mixture to a first feeding port provided at an upstream position of the extruder, feeding alkaline earth metals to a second feeding port provided at a downstream position of the extruder, melt-kneading to a mixture, allowing the obtained molten resin mixture to flow into the resin impregnating bath, passing a continuous fiber bundle through the molten resin mixture in the resin impregnating bath to impregnate the continuous fiber bundle with the resin mixture.

6 Claims, 1 Drawing Sheet

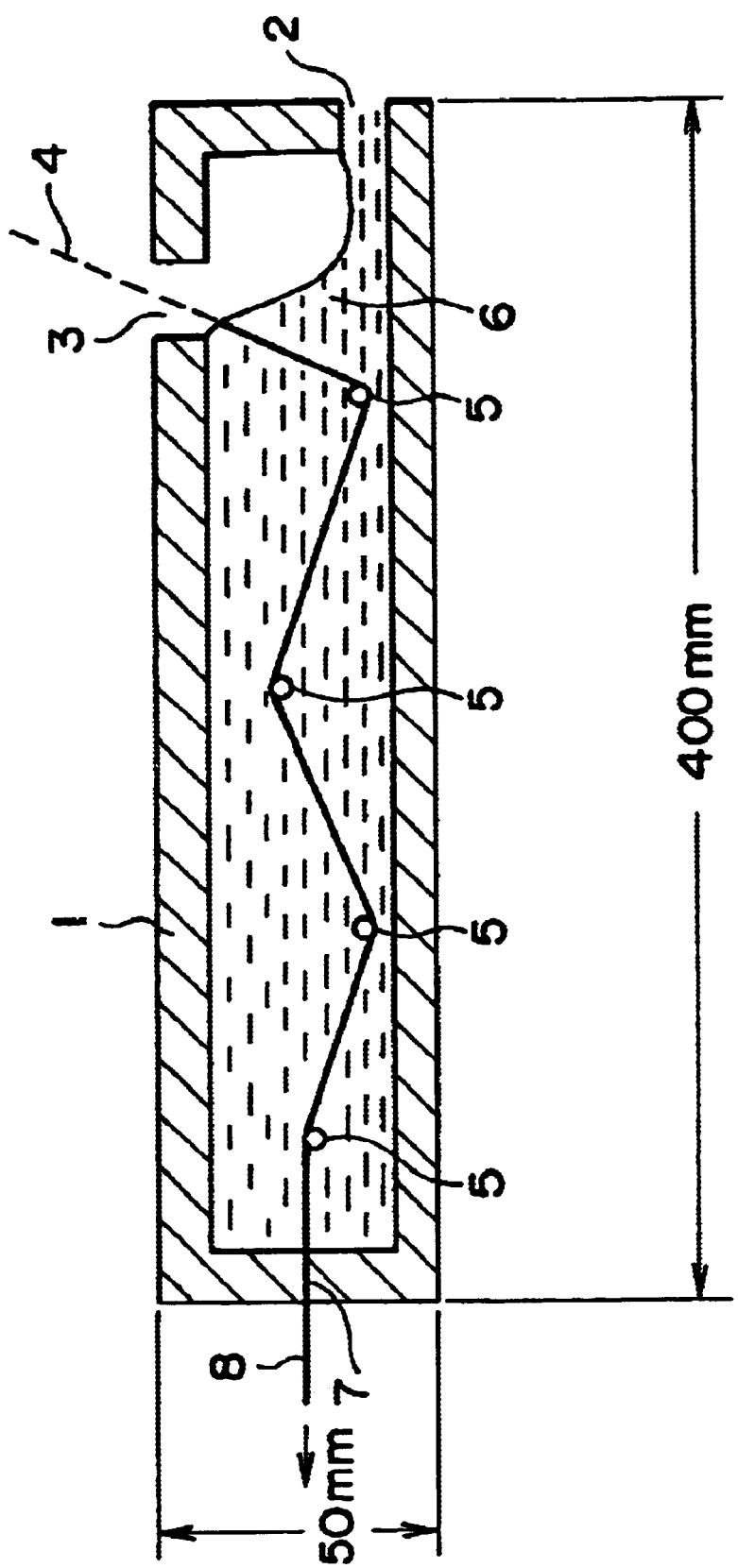

PROCESS FOR THE PREPARATION OF FIBER-FILLED THERMOPLASTIC RESIN COMPOSITION

TECHNICAL FIELD

The present invention relates to a production process for a fiber-filled thermoplastic resin composition having excellent mechanical characteristics.

BACKGROUND ART

It has so far been known to improve properties such as a mechanical strength by charging fibrous materials and various fillers into a thermoplastic resin. Disclosed in Japanese Patent Application Laid-Open No. 10837/1975 is a reinforced polyolefin resin composition prepared by adding maleic anhydride or itaconic acid and a specific inorganic metal compound such as magnesium oxide and magnesium hydroxide to polyolefin to react them and then mix glass fibers therewith.

However, the reinforcing effect thereof is not necessarily satisfactory.

DISCLOSURE OF THE INVENTION

An object of the present invention is to provide a production process for a fiber-filled thermoplastic resin composition which provides processed articles having high impact strength and which has a high fluidity.

The first production process of the present invention for a fiber-filled thermoplastic resin composition is as follows:

(1) A production process for a long fiber-filled thermoplastic resin composition, comprising:
  using an apparatus having an extruder with at least two raw material feeding ports and at an end thereof (lowest downstream side), a resin-impregnating bath for impregnating bundles of continuous fibers with a molten resin liquid,
  feeding a fixed amount of a resin mixture comprising a resin containing polyolefin, an unsaturated carboxylic acid and an organic peroxide; a resin containing polyolefin, an unsaturated carboxylic anhydride and an organic peroxide; or a resin containing polyolefin, an unsaturated carboxylic acid, an unsaturated carboxylic anhydride and an organic peroxide to a raw material feeding port (first feeding port) on an upstream side of the extruder,
  feeding a fixed amount of at least one alkaline earth metal selected from the group consisting of substances, hydroxides and oxides of alkaline earth metals to a raw material feeding port (second feeding port) on a downstream side of the extruder, which is disposed in a position where the above mixture is sufficiently melt-kneaded.
  allowing a molten resin mixture obtained by melt-kneading to flow into the impregnating bath described above,
  passing a continuous fiber bundle through the molten resin mixture in this impregnating bath to impregnate the continuous fiber bundle with the above resin mixture,
  drawing the above fiber bundle from a resin-impregnated fiber outlet having an adjustable aperture to thereby align the long fibers in the same direction and control the fiber content, and
  then solidifying it.

(2) The production process for a long fiber-filled thermoplastic resin composition as described in the above item (1), wherein the resin mixture comprising 94 to 20% by weight of the resin containing polyolefin, 0.01 to 5.0% by weight of the unsaturated carboxylic acid or/and the unsaturated carboxylic anhydride and 0.01 to 0.5% by weight of the organic peroxide is fed to the first feeding port; 0.01 to 5.0% by weight of the alkaline earth metal is fed to the second feeding port; and the aperture of the resin-impregnated fiber outlet is adjusted so that the fiber content becomes 5 to 80% by weight (provided that % by weight is a value based on the resin composition to be produced).

The second production process of the present invention for a fiber-filled thermoplastic resin composition is as follows:

(3) A production process for a short fiber-filled thermoplastic resin composition, comprising:
  feeding a fixed amount of a resin mixture comprising a resin containing polyolefin, an unsaturated carboxylic acid and an organic peroxide; a resin containing polyolefin, an unsaturated carboxylic anhydride and an organic peroxide; or a resin containing polyolefin, an unsaturated carboxylic acid, an unsaturated carboxylic anhydride and an organic peroxide to a raw material feeding port (first feeding port) on an upstream side of an extruder having at least three raw material feeding ports,
  feeding a fixed amount of at least one alkaline earth metal selected from the group consisting of substances, hydroxides and oxides of alkaline earth metals to a raw material feeding port (second feeding port) to melt-knead them,
  feeding a fixed amount of a fibrous material from a third feeding port to further melt-knead them, and
  then cooling and pelletizing the mixture.

(4) The production process for a short fiber-filled thermoplastic resin composition as described in the above item (3), wherein the resin mixture comprising 94 to 20% by weight of the resin containing polyolefin, 0.01 to 5.0% by weight of the unsaturated carboxylic acid or/and the unsaturated carboxylic anhydride and 0.01 to 0.5% by weight of the organic peroxide is fed to the first feeding port; 0.01 to 5.0% by weight of the alkaline earth metal is fed to the second feeding port; and 5 to 80% by weight of the fibrous material is further fed from the third feeding port (provided that % by weight is a value based on the resin composition to be produced).

BRIEF DESCRIPTION OF THE DRAWINGS

FIG. 1 is a schematic explanatory drawing in which a continuous fiber bundle is impregnated with a resin mixture, wherein 1 represents a molten-resin-impregnating bath; 2 represents a molten resin mixture-feeding port; 3 represents a continuous fiber bundle-introducing port; 4 represents a continuous fiber bundle; 5 represents an opening pin; 6 represents a molten resin mixture; 7 represents a resin-impregnated fiber bundle outlet (outlet nozzle); and 8 represents a resin-impregnated fiber bundle.

BEST MODE FOR CARRYING OUT THE INVENTION

The polyolefin used for the resin containing polyolefin in the production process of the present invention is a concept including a composition comprising a crystalline homopolymer or crystalline copolymer of α-olefins having usually 2 to 10 carbon atoms such as ethylene, propylene, 1-butene, 1-pentene, 1-hexene, 4-methyl-1-pentene, 1-octene and 1-decene, or two or more kinds thereof. Among them, polypropylene or crystalline copolymers of propylene and other α-olefins comprising propylene as a principal component are rich in general applicability from a practical point of view. Included are, for example, polypropylene (crystalline propylene homopolymers and crystalline propylene-ethylene copolymers) and polyethylene (high-density polyethylene, low density polyethylene, linear low-density polyethylene and extra low-density polyethylene). Further, mixtures thereof containing polystyrene, rubber and acrylate rubber are included. The blending amount of this resin containing polyolefin is preferably 94 to 20% by weight, more preferably 89 to 40% by weight based on the resin composition.

The organic peroxide used for the production process of the present invention includes aliphatic peroxides such as di-t-butylperoxyhexyne, 2,5-di-methyl-2, 5-di(t-butylperoxy) hexane and t-butyl peroxide; and aromatic peroxides such as 1,3-dicumyl peroxide, 1,3-bis(t-butylperoxyisopropyl) benzene and benzoyl peroxide. In particular, 1,3-bis(t-butylperoxyisopropyl) benzene is preferred. The addition amount of these organic peroxides shall not specifically be restricted and is suitably 0.01 to 0.5% by weight based on the resin composition.

The unsaturated carboxylic acid or anhydride thereof used for the production process of the present invention includes acrylic acid, methacrylic acid, maleic acid, citraconic acid, itaconic acid, metaconic acid, tetrtahydrophthalic acid, nor-bornenedicarboxylic acid, and acid anhydrides thereof. They can be used alone or in combination of two or more kinds thereof. In particular, maleic anhydride is preferred. The addition amount of these unsaturated carboxylic acids or anhydrides thereof shall not specifically be restricted and is preferably 0.01 to 5.0% by weight, more preferably 0.1 to 1.0% by weight based on the resin composition.

The alkaline earth metal used for the production process of the present invention is at least one selected from the group consisting of substances, hydroxides and oxides of alkaline earth metals and includes magnesium hydroxide, calcium hydroxide and magnesium oxide. They can be used alone or in combination of two or more kinds thereof. In particular, magnesium hydroxide is preferably used. The addition amount of these alkaline earth metals shall not specifically be restricted and is preferably 0.01 to 5.0% by weight, more preferably 0.1 to 1.0% by weight based on the resin composition.

Publicly known ones such as glass fibers, carbon fibers, metal fibers and high polymer fibers can widely be given as examples of the continuous fiber bundle or fibrous material used for the production process of the present invention. They can be used alone or in combination of two or more kinds thereof. Glass fibers are preferably used in terms of that they are readily available and that they can provide processed articles having an excellent impact resistance. Further, preferred are glass fibers subjected to surface treatment with a silane-coupling agent for providing a thermoplastic resin with an interfacial adhesive property.

The continuous glass fiber bundle on the market used for the first production process includes a glass roving. Usually included is one having an average filament fiber diameter of 4 to 30 $\mu$, a filament collecting number of 400 to 10,000 and a textile yarn number count of 300 to 20,000 g/km, preferably one having an average filament fiber diameter of 9 to 23 $\mu$ and a filament collecting number of 1,000 to 6,000. The fibrous material used for the second production process includes a chopped strand on the market having an average filament fiber diameter of 6 to 23 $\mu$.

The fiber-filled thermoplastic resin composition obtained preferably according to the production process of the present invention has a fiber content of 5 to 80% by weight, preferably 10 to 60% by weight.

The extruder used for the production process of the present invention has at least two raw material feeding ports. To be specific, it has a raw material feeding port (first feeding port) equipped so that a fixed amount of the mixture comprising the resin containing polyolefin and the organic peroxide can be fed to the uppermost stream side and a raw material feeding port (second feeding port) equipped so that a fixed amount of the alkaline earth metal can be fed to the middle. The type thereof shall not specifically be restricted, and an extruder of either a twin-screw or single screw can be used. A twin-screw extruder is preferred from a viewpoint of a kneading property.

Further, in order to reduce sufficiently the viscosity of the polyolefin resin component in the presence of the organic peroxide and disperse homogeneously the hydroxide and oxide components of the metals, L/D of from the first feeding port up to the second feeding port falls preferably in a range of 10 or more, more preferably 15 to 25, and L/D of from the second feeding port up to the outlet of the die falls preferably in a range of 3 or more, more preferably 5 to 15. Also, a kneading zone for improving a kneading property is preferably provided between the first feeding port and the second feeding port and between the second feeding port and the die. Further, a vent for deaeration is preferably disposed between the second feeding port and the die. (L/D represents a ratio of a length L of a screw of the extruder to a diameter D thereof).

The first production process of the present invention shall be explained.

Used are an apparatus having the extruder with at least two raw material feeding ports at an end thereof (lowest downstream side), a resin-impregnating bath for impregnating bundles of continuous fibers with a molten resin liquid. A fixed amount of the resin mixture comprising a resin containing polyolefin, an unsaturated carboxylic acid and an organic peroxide; a resin containing polyolefin, an unsaturated carboxylic anhydride and an organic peroxide; or a resin containing polyolefin, an unsaturated carboxylic acid, an unsaturated carboxylic anhydride and an organic peroxide is fed to the raw material feeding port (first feeding port) on an upstream side of the extruder. Further, a fixed amount of at least one alkaline earth metal selected from the group consisting of single substances, hydroxides and oxides of alkaline earth metals is fed to the raw material feeding port (second feeding port) on a downstream side of the extruder, which is disposed in a position where the above mixture is sufficiently melt-neaded, and melt-kneaded.

The production process shall be explained below with reference to FIG. 1. A molten resin mixture 6 obtained by melt-kneading described above is allowed to flow from a molten resin mixture-feeding port 2 into a molten resin-impregnating bath 1, and a continuous fiber bundle 4 is introduced from another part (continuous fiber bundle-introducing port 3) of the above molten resin-impregnating bath to impregnate the continuous fiber bundle 4 with the molten resin mixture 6 in the above impregnating bath. This continuous fiber bundle 4 is drawn from an outlet nozzle 7 (the preceding resin-impregnated fiber outlet having an adjustable aperture) while winding the continuous fiber bundle 4 on an opening pin 5 to thereby produce a resin-impregnated fiber bundle 8 in which the long fibers are aligned in the same direction and which has a controlled fiber content. Further, the above fiber bundle 8 is dried and then cut to obtain a pelletized composition containing the long fibers aligned in the same direction.

Further, the molten resin-impregnating bath and equipments therefor related to the production process of the present invention shall be explained.

This molten resin-impregnating bath is a bath for allowing the molten resin mixture obtained by melt-kneading by means of the extruder to flow while storing a prescribed amount thereof. It is equipped with a heater and can be preferably controlled to a temperature higher than a melting point of a resin to be used, which is usually 160 to 300° C. Further, this molten resin-impregnating bath 1 is equipped with the molten resin mixture-feeding port 2, the continuous fiber bundle-introducing port 3, the in-impregnating bath-opening pin 5 and the outlet nozzle 7 (the resin-impregnated fiber bundle outlet).

Molten resin mixture-feeding port 2

Usually, the molten resin mixture-feeding port 2 is provided on a top board, a bottom board or an upstream side boundary wall of the molten resin-impregnating bath Continuous fiber bundle-introducing port 3

Usually, the continuous fiber bundle-introducing port 3 is provided on an upstream side boundary wall or a top board of the molten resin-impregnating bath 1. When it is provided on the upstream side boundary wall, a cross-sectional shape of the continuous fiber bundle (fiber-concentrated substance) 4 or such a slit shape as fitted to a cross section of one obtained by arranging the above fiber bundle 4 in several rows will be sufficient for the shape thereof. When it is provided on the top board at the upstream side, there is no concern that the molten resin mixture 6 is leaked from the continuous fiber bundle-introducing-port 3, and therefore it may have a large opening part, and such shape as described above will have no problem.

In-molten resin-impregnating bath-opening pin 5

A member having an almost circular cross section (usually called an opening pin 5) is used as a means for opening and impregnating the continuous fiber bundle 4. This continuous fiber bundle 4 is drawn in the molten resin-impregnating bath 1 while winding in zigzags on the opening pin 5, whereby the continuous fiber bundle 4 can be impregnated with the molten resin mixture 6. At least one opening pin 5 is preferably provided.

Outlet nozzle 7 (resin-impregnated fiber bundle outlet)

The impregnation amount of the molten resin mixture 6 in the continuous fiber bundle 4 is controlled by adjusting the diameter of the outlet nozzle 7 provided in the lowest downstream part of the molten resin-impregnating bath. Accordingly, when the fiber bundle of the same yarn number count is used, the amount of the resin adhered is increased if the nozzle diameter is large, and the fiber content is decreased. On the contrary, the amount of the resin adhered is decreased if the nozzle diameter is small, and the fiber content grows large.

The fiber bundle (resin-impregnated fiber bundle 8) impregnated with the molten resin mixture is pelletized by means of a cooling equipment, a receiving roll and, if necessary, a pelletizer, which are installed after the outlet nozzle 7, whereby obtained is a thermoplastic resin composition containing long fibers which are aligned in the same direction according to the first production process of the present invention.

In the second production process of the present invention, an extruder having at least three raw material feeding ports is used. To be specific, used is an extruder provided with a raw material feeding port (first feeding port) on the uppermost stream side so that a fixed amount of the mixture containing the polyolefin resin and organic peroxide can be fed, a raw material-feeding port (second feeding port) in the middle thereof so that a fixed amount of the single substance, hydroxide and oxide of the alkaline earth metal or a mixture thereof can be fed, and a raw material feeding port (third feeding port) on the lowest downstream side so that a fixed amount of a glass chopped strand can be fed.

The composition is melt-kneaded by means of this extruder, then cooled and pelletized, whereby a short fiber-filled thermoplastic resin composition is produced.

EXAMPLES

The production process of the present invention for a fiber-filled thermoplastic resin composition shall specifically be explained with reference to the following examples and comparative examples. However, the scope of the present invention shall not be restricted by the examples.

The resin compositions obtained in the examples and comparative examples were evaluated by test methods shown below. Used were test pieces molded by means of a family test piece mold on the conditions of a cylinder temperature of 250° C., a mold temperature of 50° C. and an in-mold pressure of 30 MPa.

(1) Tensile strength

Determined according to JIS K7113.

(2) Flexural test

Determined according to JIS K7203.

(3) Flexural elastic modulus

Determined according to JIS K7203.

(4) Izod impact strength

Determined according to JIS K7110.

Example 1

A twin-screw extruder of φ30 mm having three raw material feeding ports (L/D; the whole=30, first to second feeding ports=16, second to third feeding ports=7, third feeding port to outlet die=7: L/D of a kneading zone; first to second feeding ports=7, second to third feeding ports=4, third feeding port to outlet die=4) was used, and put therein from the first feeding port were 58.15 parts by weight of polypropylene resin powder (propylene homopolymer) as a resin containing polyolefin, 0.2 part by weight of maleic anhydride as an unsaturated carboxylic anhydride, 0.05 part by weight of 1,3-bis(t-butyl-peroxopropyl) benzene as an organic peroxide, 0.3 part by weight of calcium stearate as a lubricant and 0.3 part by weight of 2,6-di-t-butyl-paracresol as a heat stabilizer. They were stirred and mixed in a mixer. A resin mixture obtained by this mixing was fed from the first feeding port, and 1.0 part by weight of magnesium hydroxide was further fed from the second feeding port. A molten resin mixture obtained by melt-kneading on the extruding conditions of a temperature of 250° C., a screw revolution of 200 rpm and a total discharge amount of 30 kg/hr was allowed to flow into the impregnating bath 1.

On the other hand, a roving 4 (average monofilament diameter: 17 μm, textile yarn number count: 2310 g/km and collecting number: 4000 filaments) of glass fibers was introduced into the above impregnating bath 1 to sufficiently impregnate the respective monofilaments in the roving of glass fibers with the molten resin mixture 6 in the above impregnating bath 1, and the roving was drawn from the roving outlet 7 in the above impregnating bath 1 so that the glass fiber content became 40% by weight (that is, the impregnation rate of the molten resin mixture was 60% by weight) by adjusting the aperture of the roving outlet 7 of the above impregnating bath. The molten resin mixture-impregnated roving 8 thus obtained was cooled in a cooling water bath and then cut to a length of 10 mm by means of a cutter for a strand, whereby produced was a pelletized long glass fiber-filled thermoplastic resin composition in which the continuous long fibers were aligned between the cut surfaces.

This composition was used and evaluated by a prescribed method, and the results thereof are shown in Table 1.

Example 2

A resin composition was prepared according to Example 1, except that magnesium oxide was substituted for magnesium hydroxide. The results thereof are shown in Table 1.

Example 3

The twin-screw extruder of φ30 mm having three raw material feeding ports (L/D; the whole=30, first to second feeding ports=16, second to third feeding ports 7, third feeding port to outlet die=7: L/D of a kneading zone; first to second feeding ports=7, second to third feeding ports=4, third feeding port to outlet die=4) was used, and 57.15 parts by weight of a polypropylene resin powder as a resin containing polyolefin, 0.2 part by weight of maleic anhydride as an unsaturated carboxylic anhydride, 0.05 part by weight of 1,3-bis(t-butyl-peroxopropyl)benzene as an organic peroxide, 0.3 part by weight of calcium stearate as a lubricant and 0.3 part by weight of 2,6-di-t-butyl-paracresol as a heat stabilizer were stirred and mixed in a mixer. A resin mixture obtained by this mixing was fed from the first feeding port, and further fed were 1.0 part by weight of magnesium hydroxide from the second feeding port and 1.0 part by weight of magnesium oxide from the third feeding port. A molten resin mixture obtained by melt-kneading on the extruding conditions of a temperature of 250° C., a screw revolution of 200 rpm and a total discharge amount of 30 kg/hr was allowed to flow into the impregnating bath.

A roving of glass fibers was impregnated with the above molten resin mixture according to Example 1, whereby a pelletized long glass fiber-filled thermoplastic resin composition was produced.

This composition was used and evaluated by a prescribed method, and the results thereof are shown in Table 1.

Comparative Example 1

A resin mixture was prepared according to Example 1 and fed from the first feeding port, except that the amount of the polypropylene resin powder was changed to 59.15 parts by weight, and magnesium hydroxide and the second feeding port were not used to repeat the procedure of Example 1. The results thereof are shown in Table 1.

Comparative Example 2

A resin composition was prepared according to Example 1, except that the amount of the polypropylene resin powder was changed to 57.15 parts by weight and the amount of magnesium hydroxide was changed to 2.0 parts by weight and that they were simultaneously fed from the first feeding port together with the resin mixture, and the second feeding port was not used. The results thereof are shown in Table 1.

TABLE 1

|  | Example | | | Comparative Example | | |
| --- | --- | --- | --- | --- | --- | --- |
|  | 1 | 2 | 3 | 1 | 2 | 3 |
| Feeding method or resin mixture | Separate feeding | Separate feeding | Separate feeding | — | Simultaneous feeding | After-feeding |
| Blending ratio[*1] of composition |  |  |  |  |  |  |
| Polyolefin (PP) | 58.15 | 58.15 | 57.15 | 59.15 | 57.15 | 57.15 |
| Unsaturated carboxylic anhydride | 0.2 | 0.2 | 0.2 | 0.2 | 0.2 | 0.2 |
| Organic peroxide | 0.05 | 0.05 | 0.05 | 0.05 | 0.05 | 0.05 |
| Lubricant | 0.3 | 0.3 | 0.3 | 0.3 | 0.3 | 0.3 |
| Heat stabilizer | 0.3 | 0.3 | 0.3 | 0.3 | 0.3 | 0.3 |
| Magnesium hydroxide | 1.0 | — | 1.0 | — | 2.0 | 2.0[*2] |
| Magnesium oxide | — | 1.0 | 1.0 | — | — | — |
| Fiber-reinforcing material (continuous fiber) | 40 | 40 | 40 | 40 | 40 | 40 |
| Mechanical strength |  |  |  |  |  |  |
| Tensile strength (MPa) | 200 | 180 | 190 | 160 | 120 | 130 |
| Flexural strength (MPa) | 230 | 210 | 220 | 190 | 150 | 160 |
| Flexural modulus (MPa) | 7,800 | 7,600 | 7,600 | 7,600 | 7,200 | 7,000 |
| Izod impact strength (kJ/m$^2$) | 105 | 100 | 90 | 70 | 65 | 50 |

[*1]: part by weight
[*2]: immediately before molding

Comparative Example 3

The resin mixture was fed from the first feeding port of the extruder in the same manner as in Example 3, except that magnesium hydroxide, the second feeding port and the third feeding port were not used, and after melt-kneading, the resin mixture was allowed to flow into the impregnating bath. A roving (average monofilament diameter: 17 μm, textile yarn number count: 2310 g/km and collecting number: 4000 filaments) of glass fibers which was a fiber reinforcing material was introduced into the above impregnating bath to sufficiently impregnate the respective monofilaments in the roving of glass fibers with the molten resin, and the roving was drawn so that the glass fiber content became 40% by weight. It was cooled in a cooling water bath and then cut to a length of 10 mm by means of a cutter for a strand, whereby a pelletized long glass fiber-filled thermoplastic resin composition was produced.

A composition obtained by adding 2 parts by weight of magnesium hydroxide to 98 parts by weight of this composition was evaluated by a prescribed method (that is, magnesium hydroxide was added immediately before molding a test piece for evaluation), and the results thereof are shown in Table 1.

Example 4

A twin-screw extruder of 45 mm having three raw material feeding ports (L/D; the whole=40, first to second feeding ports 22, second to third feeding ports 9, third feeding port to outlet die=9: L/D of a kneading zone; first to second feeding ports=7, second to third feeding ports=4, third feeding port to outlet die=4) was used, and 67.1 parts by weight of a polypropylene resin powder as a resin containing polyolefin, 0.2 part by weight of maleic anhydride as an unsaturated carboxylic anhydride, 0.1 part by weight of 1,3-bis (t-butyl-peroxopropyl)benzene as an organic peroxide, 0.3 part by weight of calcium stearate as a lubricant and 0.3 part by weight of 2,6-di-t-butyl-paracresol as a heat stabilizer were stirred and mixed in a mixer. A resin mixture obtained by this mixing was fed from the first feeding port, and further fed were 2.0 parts by weight of magnesium hydroxide from the second feeding port and 30 parts by weight of a glass chopped strand from the third feeding port. They were melt-kneaded on the extruding conditions of a temperature of 250° C., a screw revolution of 200 rpm and a total discharge amount of 30 kg/hr and then cooled in a water bath, followed by pelletizing by means of a cutter for a strand, whereby a short fiber-filled thermoplastic resin composition was produced.

This composition was used and evaluated by a prescribed method, and the results thereof are shown in Table 2.

Comparative Example 4

A resin mixture was prepared according to Example 1 and fed from the first feeding port, except that the amount of the polypropylene resin powder was changed to 69.1 parts by weight, and magnesium hydroxide and the second feeding port were not used to repeat the procedure of Example 4. The results thereof are shown in Table 2.

Comparative Example 5

A resin composition was prepared according to Example 4, except that the resin mixture and magnesium hydroxide were fed simultaneously from the first feeding port together and the second feeding port was not used. The results thereof are shown in Table 2.

TABLE 2

| | Example 4 | Comparative Example 4 | Comparative Example 5 |
|---|---|---|---|
| Feeding method or resin mixture | Separate feeding | — | Simultaneous feeding |
| Blending ratio* of composition | | | |
| Polyolefin (PP) | 67.1 | 69.1 | 67.1 |
| Unsaturated carboxylic anhydride | 0.2 | 0.2 | 0.2 |
| Organic peroxide | 0.1 | 0.1 | 0.1 |
| Lubricant | 0.3 | 0.3 | 0.3 |
| Heat stabilizer | 0.3 | 0.3 | 0.3 |
| Magnesium hydroxide | 2.0 | — | 2.0 |
| Magnesium oxide | — | — | — |
| Fiber-reinforcing material (glass chopped strand) | 30 | 30 | 30 |
| Mechanical strength | | | |
| Tensile strength (MPa) | 140 | 110 | 80 |
| Flexural strength (MPa) | 180 | 150 | 110 |
| Flexural modulus (MPa) | 7200 | 6800 | 6500 |
| Izod impact strength (kJ/m$^2$) | 8 | 5 | 4 |

*part by weight

Industrial Applicability

In any examples (Examples 1 to 3) according to the first production process of the present invention in which the resin components and alkaline earth metals are separately fed, molded articles prepared by using the resulting resin compositions are excellent in mechanical strengths such as a tensile strength, a flexural strength and an Izod impact strength. In contrast with this, the resin composition in which alkaline earth metals were not fed (Comparative Example 1), the resin composition in which the resin component and alkaline earth metals were not separately fed (Comparative Example 2) and the resin composition in which alkaline earth metals were mixed in molding (Comparative Example 3) provided low values of mechanical strengths. It is considered that when alkaline earth metals are mixed in molding, long fibers are cut, so that the mechanical strengths are lowered.

Further, the resin composition obtained in Example 3 according to the second production process of the present invention provides higher mechanical strengths than those of the resin composition in which alkaline earth metals were not fed (Comparative Example 4) and the resin composition in which the resin component and alkaline earth metals were not separately fed (Comparative Example 5). However, the impact strength of the resin composition containing long fibers obtained according to the first production process is more excellent.

What is claimed is:

1. A production process for a short fiber-filled thermoplastic resin composition, comprising:
   feeding to an upstream raw material first feeding port in an extruder having at least three raw material feeding ports, a fixed amount of a resin mixture comprising:
   (a) a resin containing polyolefin, an unsaturated carboxylic acid and an organic peroxide;

(b) a resin containing polyolefin, an unsaturated carboxylic anhydride and an organic peroxide; or (c) a resin containing polyolefin, an unsaturated carboxylic acid, an unsaturated carboxylic anhydride and an organic peroxide;

feeding to a downstream raw material second feeding port, a fixed amount of at least one alkaline earth metal selected from the group consisting of substances of alkaline earth metals, hydroxides of alkaline earth metals and oxides of alkaline earth metals, wherein the L/D of the first feeding port to the second feeding port is 10 or more;

feeding a fixed amount of a fibrous material from a third feeding port to further melt-knead the resin; and cooling and pelletizing the mixture, wherein the resin mixture comprises 94 to 20% by weight of polyolefin, 0.01 to 5.0% by weight of the unsaturated carboxylic acid or/and unsaturated carboxylic anhydride, and 0.01 to 0.5% by weight of the organic peroxide is fed to the first feeding port; 0.01 to 5.0% by weight of the alkaline earth metal is fed to the second feeding port; and 5 to 80% by the weight of the fibrous material is fed from the third feeding port (% by the weight being a value based on the resin composition to be produced).

2. A process according to claim 1, wherein the alkaline earth metal is selected from he group consisting of magnesium hydroxide, calcium hydroxide, magnesium oxide, and mixtures thereof.

3. A process according to claim 1, wherein the L/D ratio ranges between 15 and 25.

4. A production process for a long fiber-filled thermoplastic resin composition, comprising:

providing an apparatus comprising an extruder provided with at least two raw material feeding ports, at least a first port at an upstream position of the extruder, and at least a second port at a downstream position of the extruder, and a resin-impregnating bath for impregnating bundles of continuous fibers with a molten resin liquid;

feeding to the first feeding port, a fixed amount of a resin mixture comprising:

(a) a resin containing polyolefin, an unsaturated carboxylic acid and an organic peroxide;

(b) a resin containing polyolefin, an unsaturated carboxylic anhydride and an organic peroxide; or (c) a resin containing polyolefin, an unsaturated carboxylic acid, an unsaturated carboxylic anhydride and an organic peroxide;

feeding to the second feeding port, a fixed amount of at least one alkaline earth metal selected from the group consisting of substances of alkaline earth metals, hydroxides of alkaline earth metals, and oxides of alkaline earth metals, wherein the L/D of the first feeding port to the second feeding port is 10 or more, whereby the resin mixture is sufficiently melt-kneaded;

allowing the molten resin mixture obtained by melt-kneading to flow into said impregnating bath, passing a continuous fiber bundle through the molten resin mixture in the impregnating bath to impregnate the continuous fiber bundle with said resin mixture;

drawing the fiber bundle from a resin-impregnating fiber outlet having an adjustable aperture to thereby align the long fibers and control the fiber content; and solidifying the fiber bundle, wherein the resin mixture comprising 94 to 20% by weight of polyolefin, 0.01 to 5.0% by weight of the unsaturated carboxylic acid or/and unsaturated carboxylic anhydride, and 0.01 to 0.5% by weight of the organic peroxide is fed to the first feeding port; 0.01 to 5.0% by weight of the alkaline earth metal is fed to the second feeding port; and the aperture of the resin-impregnating fiber outlet is adjusted so that the fiber content becomes 5 to 80% by the weight based on the resin composition to be produced.

5. A new process according to claim 4, wherein the alkaline earth metal is selected from the group consisting of magnesium hydroxide, calcium hydroxide, magnesium oxide, and mixtures thereof.

6. A process according to claim 4, wherein the L/D ratio ranges between 15 and 25.

* * * * *